United States Patent
Zinke et al.

(10) Patent No.: US 6,480,138 B1
(45) Date of Patent: Nov. 12, 2002

(54) METHOD OF TRANSMITTING DATA WITHIN PULSE INTERVALS OF A ROTATIONAL SPEED SIGNAL, AND CIRCUIT ARRANGEMENT FOR IMPLEMENTING THE METHOD

(75) Inventors: Olaf Zinke, München; Wolfgang Fey, Niedernhausen; Heinz Loreck, Idstein, all of (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/367,149

(22) PCT Filed: Jan. 27, 1998

(86) PCT No.: PCT/EP98/00435

§ 371 (c)(1),
(2), (4) Date: Oct. 22, 1999

(87) PCT Pub. No.: WO98/35329

PCT Pub. Date: Aug. 13, 1998

(30) Foreign Application Priority Data

Feb. 11, 1997 (DE) .......................... 197 05 063
Apr. 5, 1997 (DE) .......................... 197 14 152

(51) Int. Cl.$^7$ ............................... G08C 19/12
(52) U.S. Cl. ................ 341/178; 340/870.24; 701/79
(58) Field of Search ............. 341/178; 340/870.24, 340/870.2; 701/70, 78, 93, 110, 79

(56) References Cited

U.S. PATENT DOCUMENTS 4,581,713 A  * 4/1986 Fennel ..................... 364/571

4,935,738 A  6/1990 Pilato
5,434,891 A  7/1995 Mery et al.

FOREIGN PATENT DOCUMENTS

| DE | 22 42 639 | 3/1974 |
| DE | 43 23 619 | 8/1994 |
| EP | 0 037 556 | 10/1981 |
| WO | 95 17680 | 6/1995 |

OTHER PUBLICATIONS

Search Report of the German Patent Office for Application No. 197 14 152.8.

* cited by examiner

Primary Examiner—Timothy Edwards, Jr.
(74) Attorney, Agent, or Firm—Rader, Fishman & Grauer PLLC

(57) ABSTRACT

The present invention relates to a method of transmitting data in pulse intervals of a rotational speed signal, wherein the maximum number of the transmittable data is determined from the period of time which is required for transmitting an information and from a time, which corresponds to the length of the pulse interval, and the maximum number of the data transmittable in a pulse interval is adapted by setting as time, which corresponds to the length of the pulse interval, a value that results from at least one recently measured pulse interval in consideration of a maximum value of the wheel acceleration. The present invention also relates to a circuit arrangement for implementing the method.

4 Claims, 3 Drawing Sheets shift register for data pulses

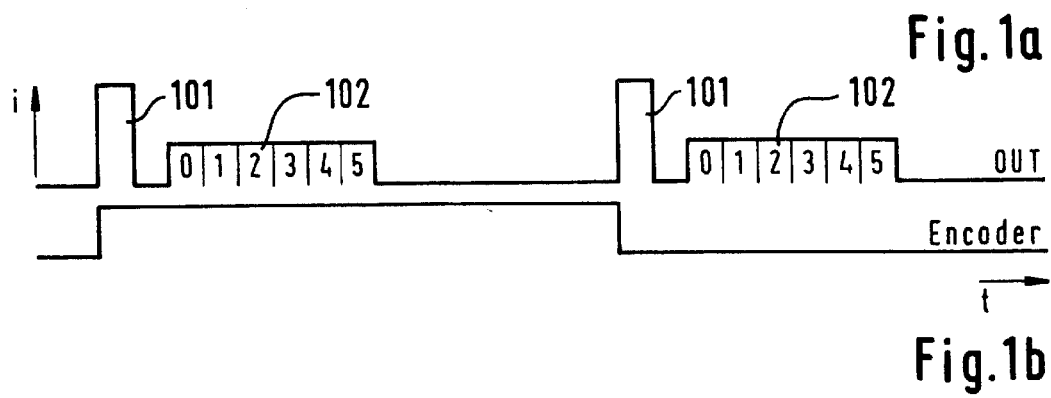
Fig. 1a
Fig. 1b
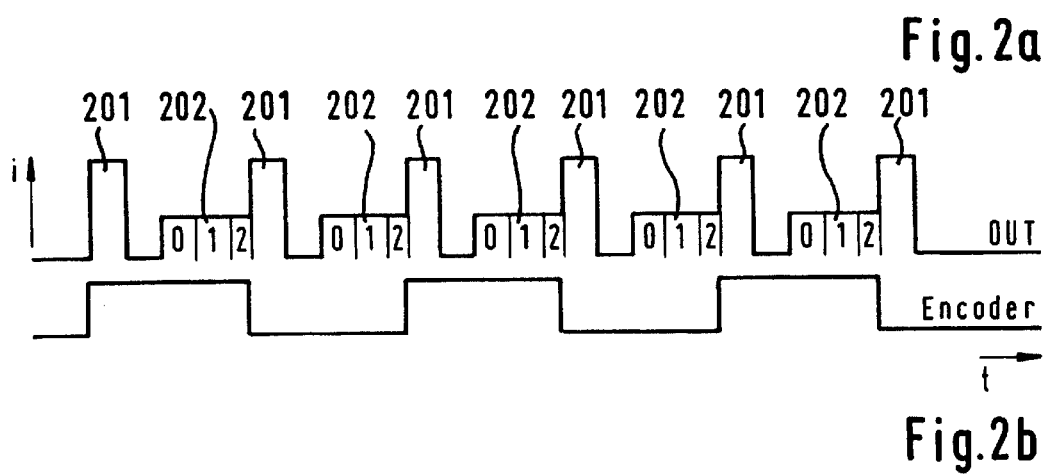
Fig. 2a
Fig. 2b shift register for data pulses

METHOD OF TRANSMITTING DATA WITHIN PULSE INTERVALS OF A ROTATIONAL SPEED SIGNAL, AND CIRCUIT ARRANGEMENT FOR IMPLEMENTING THE METHOD

TECHNICAL FIELD

The present invention relates to a method of transmitting data and more particularly relates to a method of transmitting data within pulse intervals of a rotational speed signal.

BACKGROUND OF THE INVENTION

German patent application No. 196 50 935.1 discloses a method of this type wherein signal pulses are sent by a rotational speed sensor. The wheel rotational speed is determined from the time interval between signal pulses. Further data are transmitted in the pulse intervals. The data may represent, for example, the driving direction, the air pressure in the tire, the brake lining wear, or other quantities which are sensed on the wheel by sensors. The data are transmitted by binary signals. The signal levels of the signal pulses of the rotational speed sensor distinguish from the signal levels in data transmission in order to make possible a reliable distinction between a rotational speed signal which is relevant under driving safety aspects and the other data. The rotational speed signal must not be disturbed by the other data. The data transmission is triggered by a signal pulse of the rotational speed sensor in the object of the present invention. In this method, the number of the transmittable data is set by way of the duration of the transmission of one single information and the time available in a pulse interval. The maximum number of the transmittable data shall be set so that, with a duration of the pulse interval which corresponds to the maximum speed of the vehicle, the transmission of the data is completed before the next signal pulse of the rotational speed signal appears.

An object of the present invention is to improve the data transmission.

According to the present invention, this object is achieved by adapting the maximum number of the data transmittable in a pulse interval by setting as time, which corresponds to the length of the pulse interval, a value that results from at least one recently measured pulse interval in consideration of a maximum value of the wheel acceleration.

Thus, the number of the data transmittable in a pulse interval is adapted as a function of the driving speed. This renders it possible, for example, to transmit an increased number of data in the range of lower speeds of the vehicle. The configuration of the protocol in terms of the number of transmittable data is hence subject to minor limitations only.

In a preferred embodiment data are transmitted in a pulse interval which are relevant at high speeds.

In case that not all the data can be transmitted because the signal pulses of the rotational speed signal succeed each other too closely, the data which are relevant at high speeds are available nevertheless. Data which do not necessarily have to be transmitted at high speeds are, for example, the information about driving forward and backward because, initially, the driving speed must be reduced before the driving direction can be reversed. Possibly, the transmission of the information about the brake lining wear may also be omitted at high driving speeds. Normally, brake lining wear takes place only comparatively slowly so that a sufficient frequency of the transmission of this information is ensured with an occasional reduction of the driving speed, depending on the driving situation, or when filling-up or taking a break. On the other hand, the air pressure of the tire is considered to be an important information which should be transmitted also at high driving speeds.

The maximum number of the data transmitted in a pulse interval is adapted so that the data transmission is terminated as soon as the next signal pulse of the rotational speed signal appears.

It is favorable that there is no delay in time when the threshold of the signal level of the rotational speed signal is exceeded, in dependence on whether the signal level of the data transmission had the value '0' or '1'.

In a preferred embodiment, a protocol of the data being transmitted is drafted, and an adaptation of the maximum number of data is effected by omitting individual or several data from the protocol, and wherein a minimum duration of at least one preceding pulse interval is determined with respect to any possible number of data being transmitted, in order to transmit this number of data. Further, it is determined by way of the established duration of at least one preceding pulse interval how many data may be transmitted as a maximum.

It shows that it can be found out comparatively easily and without great effort in real time how many data can be transmitted.

In a specific embodiment, the data transmission of a signal pulse of the rotational speed signal is discontinued when the duration of the data transmission is so long that already the next signal pulse of the rotational speed signal prevails. Favorably, it is taken into account in the evaluation of the rotational speed signal whether the information discontinued upon the appearance of the signal pulse of the rotational speed signal had the value '0' or '1'.

It is an advantage that as many data as possible can still be transmitted. The transmission of the data is terminated only when this is actually necessary. The height of the signal level upon stopping the data processing indicates the time delay by which the corresponding threshold of the rotational speed signal is exceeded.

In a disclosed circuit arrangement, a signal of an oscillator and a second signal are sent to a counter in order to measure the at least one pulse interval. The second signal represents the appearance of a signal pulse of the rotational speed signal.

This permits easily determining the duration of the pulse interval, on the one hand. On the other hand, it is easy to determine by way of this pulse interval and the table how many data can reliably be transmitted.

BRIEF DESCRIPTION OF THE DRAWINGS

FIG. 1 is a view of the time variation of the signal level for a data transmission in pulse intervals.

FIG. 2 is a view of the time variation of the signal level for a data transmission in pulse intervals, wherein the bit with number 2 is terminated.

DETAILED DESCRIPTION OF THE PREFERRED EMBODIMENTS

Figure 3A:
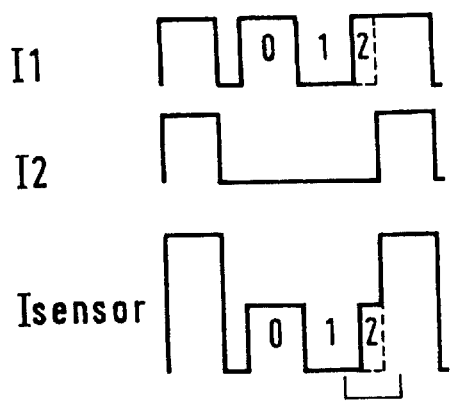
FIG. 3 is a view of the time variation by which the threshold of the signal pulse of the rotational speed signal is identified.

FIG. 1 shows a view of the signal level in a data transmission in pulse intervals. As can be taken from FIG.

1a, the signal level of the signal pulses of the rotational speed signal 101 is in excess of the signal level in the data transmission 102. This permits making a distinction between the signal pulse of the rotational speed signal and signal pulses of the data transmission, which prevents disturbances in the transmission of the rotational speed due to the transmission of other data. FIG. 1b shows the associated signal variation of the encoder which alternates the signal level every time a leading edge of the signal pulse of the rotational speed signal appears. In the interval between two signal pulses 101 of the rotational speed signal, data in the data bits with the numbers 0 to 5 are transmitted in the embodiment shown.

FIG. 2 shows the transmission of signal pulses of a rotational speed signal 201, and data 202 are in turn transmitted in the intervals between the signal pulses 201. As can be seen in FIG. 2a, the transmission of the data is terminated already at the data bit designated by number 2. The reason is that due to the high vehicle speed the time sequence of the signal pulses 201 of the rotational speed signal is so close that the time is not sufficient for the complete transmission of all data bits.

Advantageously, sorting of the data during the transmission is so that the data which are important constantly or especially at high speeds are placed in the 'front' data bits so that these pieces of information are transmitted also at high vehicle speeds. In the 'rear' data bits, those pieces of information may be transmitted whose transmission in longer intervals can be tolerated (referring to the brake lining wear indicator, for example) or data which cannot change anyway at high speeds, such as the information about driving forward or backward.

FIG. 3 illustrates the course of time permitting the identification of the threshold of the signal pulse of the rotational speed signal.

The illustration of the curves with the vertical edges, in the illustration from the top to the bottom, relates to the signal level in the data transmission (current source I1), the signal level of the rotational speed signal (current source 12 in addition to current source I1) and the resulting combined signal level (Isensor).

Figure 3B:
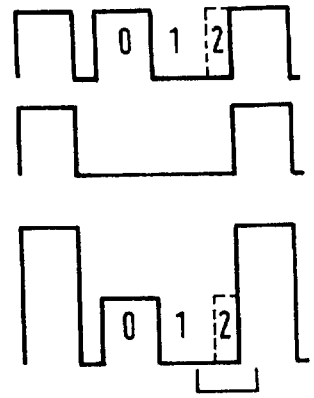

FIG. 3a shows the conditions when the signal level adopts the value '1' with a signal pulse of the rotational speed signal in the data transmission. FIG. 3b shows the conditions when the signal level adopts the value '0' with a signal pulse of the rotational speed signal in the data transmission.

Due to the non-ideal behavior of the components and the limitation of the pulse edges due to the HF-radiation, the abrupt changes in the signal levels during switching on/off of the corresponding current sources do not occur vertically but with a certain rise in time.

The signal level of the encoder changes when the signal level of the sensor exceeds the threshold. This can only happen in the presence of a signal pulse of the rotational speed signal, that means when both current sources are connected.

Figure 3C:
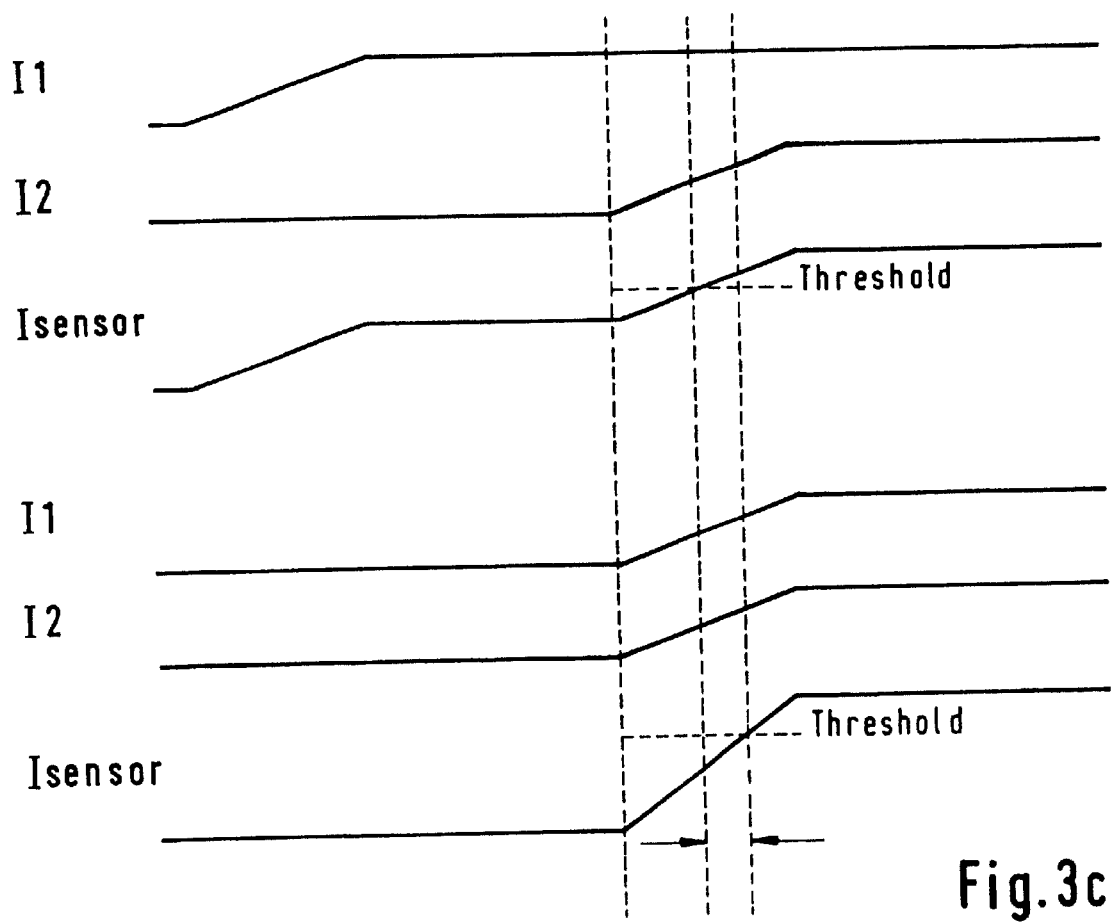

As can be seen in FIG. 3c, the alternations of the signal levels do not occur vertically but with a certain rise time. The time from the beginning of an alternation of the signal level of the rotational speed signal until the threshold is exceeded depends on the 'start value' of the signal level of the rotational speed signal. This causes a dependency on whether the signal level of the data transmission had adopted the value '0' (as shown in FIG. 3a) or '1' (as shown in FIG. 3b) upon termination of the data transmission, i.e., at the beginning of the signal pulse of the rotational speed signal.

When the signal level of the data transmission had adopted the value '1', the signal level with a signal pulse of the rotational speed signal will exceed the threshold correspondingly prematurely. This becomes apparent from the illustration of the three diagrams at the top of FIG. 3c in which the conditions of FIG. 3a are shown. Because the flowing current Isensor exhibits already a value greater than 0 at the beginning of the signal pulse of the rotational speed signal, the threshold is exceeded correspondingly earlier.

The three diagrams at the bottom of FIG. 3c show the conditions of FIG. 3b. The value of the current Isensor rises from 0 onwards, for what reason the rise time until the threshold is exceeded is correspondingly longer.

The resultant time shift is marked by arrows at the bottom of FIG. 3c.

Thus, a favorable distinction is made in the evaluation of the rotational speed signal as to whether the signal level of the data transmission at the termination of the data transmission by the rotational speed signal had adopted '0' or '1'. When the signal level was at '1', it is advantageously considered that exceeding of the threshold took place in a premature fashion. This delay in time can be estimated based on the rise time of the signal which, in turn, generally depends on the components used and their quality, and the magnitude of the signal level during data transmission.

As an alternative of this consideration, whether the signal level of the data transmission had adopted '0' or '1' when the data transmission was stopped, it can also be estimated how many data can be transmitted. This maximum number of data can be determined from the vehicle speed, i.e., the previous distance between two signal pulses of the rotational speed signal and a maximum value of the acceleration. In this case, only as many data will be transmitted as can reliably be transmitted in the pulse interval between the signal pulses of the rotational speed signal. This permits ensuring at least to a large extent that the signal level in a signal pulse of the rotational speed signal does not adopt the value '1' due to a data transmission.

The pulse duty factor of the encoder signal is not exactly 1:1. Therefore, it is rather the pulse interval (n−2) which is used as an evaluation basis for a pulse interval n. To simplify the illustration, however, the length of the pulse interval n will be illustrated as a function of the pulse interval (n−1) in the following description.

The length of the current time window n corresponds roughly to the length of the preceding time window n−1 at a constant speed. When a wheel accelerates, the width of the time window will be shortened by an amount which corresponds to the acceleration value. Because the acceleration value is not predictable, the maximum possible acceleration value must be employed in order to reliably cover even the worst case. This maximum possible acceleration value can be fixed by way of plausibility considerations. Usually, this maximum acceleration value is independent of speed.

Due to this fixed acceleration value, independent of speed, a different variation of the signal period duration results for each initial speed (or associated signal period duration). An estimation for this signal period duration shall be presented hereinbelow.

Terms:
  a_max: maximum acceleration value (in excess of this value, a time shift due to the discontinued data transmission is tolerable under certain circumstances)
  K_vF: factor of conversion from speed to frequency
    K_vF=f/v
  v_0: initial speed T_0: signal period duration relating to v_0
v_1: speed after the acceleration
T_1: signal period duration relating to v_1.

$$T\_0 = 1/(v\_0 * K\_vF)$$

$$v = v\_1 - v\_0 = a\_max * T\_0$$

$$T = T\_1 - T\_0$$

$$v\_1 = v\_0 + a\_max * T\_0$$

$$T\_1 = 1/(v\_1 * K\_vF) = 1/((v\_0 + a\_max * T\_0) * K\_vF)$$

Replacing v_0 results in:

$$T\_1 = 1/(((1/T\_0 * K\_vF) + a\_max * T\_0) * K\_vF)$$

$$T\_1 = T\_0/(1 + a\_max * T\_0^2 * K\_vF)$$

From this follows for T:

$$T = T\_0 * (1/(1 + a\_max * T\_0^2 * K\_vF) - 1)$$

This period duration must be halved due to the definition of the period duration of the encoder in order to achieve the length of the pulse interval during two signal pulses of the rotational speed signal generator.
Hence follows:

$$t\_(n) = 2 * t\_(n-1)/(2 * (1 + a\_max * (2 * t\_(n-1))^2 * K\_vF))$$

$$t\_(n) = t\_(n-1)/(1 + 4 * a\_max * (t\_(n-1))^2 * K\_vF)$$

with
  t_p: duration of the signal pulse of the rotational speed signal including the interval time after the signal pulse
  t d: duration of a data pulse (1 bit) the number n_d of possible data pulses in the pulse interval t_n is obtained:

$$n\_d = \text{integer}((t\_n - t\_p)/t\_d).$$

It is possible to determine, or each pulse interval, the maximum number of data which can still be reliably transmitted. However, the circuit structure is favorably reduced by fixing a defined minimum duration of at least one preceding time interval in a table for any possible number of data being transmitted. Measuring the time interval between two signal pulses of the rotational speed signal will then be sufficient in the current operation in order to find out from the table how many data can reliably be transmitted.

To draft a table of this type, the following relation applies:

$$n\_d = (t\_n - t\_p)/t\_d$$

$$n\_d * t\_d = t\_(n-1) * (1 + 4 * a\_max * (t\_(n-1))^2 * K\_vF) - t\_p$$

and A=n_d*t_d+t_p gilt:

$$4 * A * a\_max * (t\_(n-1))^2 * K\_vF - t\_(n-1) + A = 0$$

$$(t\_(n-1))^2 - 1/(4 * A * a\_max * K\_vF) * t\_(n-1) + 1/(4 * a\_max * K\_vF) = 0$$

The relevant solution from this quadratic is:

$$t\_(n-1) = 1/(8 * A * a\_max * K\_vF) - 1/(64 * A^2 * (a\_max)^2 * (K\_vF)^2) - 1/(4 * a\_max * K\_vF)$$

A minimum duration t_(n-1) of the pulse interval between two preceding signal pulses of the rotational speed signal can be determined for each number of data being transmitted by means of this quadratic.

Figure 4:
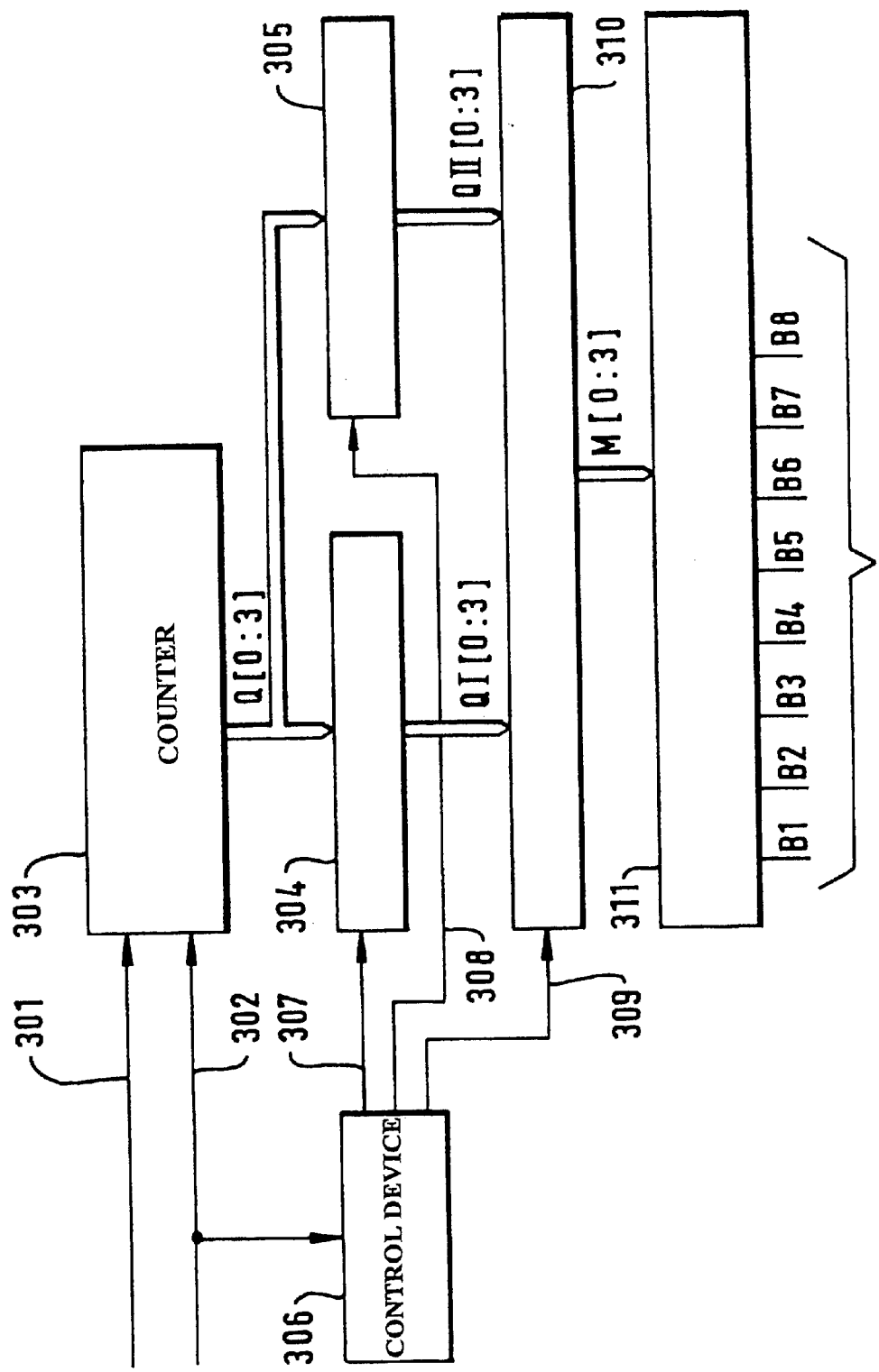
FIG. 4 is a schematic diagram of a circuit arrangement for implementing the method.

FIG. 4 shows a schematic diagram of a circuit arrangement by which the maximum number of data can be determined which is reliably transmittable. The length of the time interval t_(n-1) is determined by way of an oscillator and a frequency counter. A defined maximum number of data that can reliably be transmitted can then be associated with a defined counter reading of the frequency counter.

The last but one interval length leads to conclude the maximum number of transmittable data in the embodiment shown.

The signal 301 of an oscillator and a signal 302 representative of the appearance of a signal pulse of the rotational speed signal is sent to a counter 303. The binary counter reading of the counter 303 is alternately loaded in one of the two binary memories 304 and 305. The loading signals 307 and 308 for the two binary memories 304 and 305 are generated by the control device 306 so that the counter reading in the respectively correct binary memories 304 and 305 is updated at the proper time. Further, the control device 306 produces a signal 309 which, by way of the multiplexer 310, causes propagation of the data disposed in the binary memory 304 or 305 to the decoder 311. In the decoder 311 itself, the maximum number of transmittable data is then determined corresponding to the binary value according to the above parameters. The release of a defined number of data corresponds to a defined minimum binary value of the word. The signals B1 - - - B8 are correspondingly set to '1' if the transmission of the respective data bit is permitted. The result of the signals B1 ... B8 in the shift register is that only those data bits can be loaded to '1' for which data transmission is allowed.

The sensor signal evaluation must also comprise a special device to prevent an erroneous interpretation of the omitted data bits as set to value '0'. The same circuit can be implemented for this purpose. The evaluating circuit 'knows' this way how many data bits the sensor will send. This is possible because the sensor and the signal evaluating circuit have at disposal the same decision criteria. It is, however, problematic that both circuits derive their clock from the clock frequencies of different oscillators. Therefore, an adaptation to the length of the synchronization pulse must be performed in the evaluating circuit also in this respect (this means, not only determination of the width of the data pulses), or the decoders existing in both circuits are configured differently in such a manner that the circuit in the receiver takes a more critical decision with respect to the permitted number of data bits. This means that it must be ensured in this case that the receiver decides earlier in favor of the omission of a data bit (or the non-evaluation of a data bit) than the circuit in the sensor. The phase shift, the accuracy, and the stability of the two independent oscillators must be taken into account.

However, it is principally also possible to transmit an information about how many data are sent at the beginning of the data transmission in the pulse interval.

What is claimed is:
1. Method of transmitting data in pulse intervals of a rotational speed signal, wherein the maximum number of the transmittable data is determined from the period of time which is required for transmitting an information and from a time which corresponds to the length of the pulse interval comprising the steps of:

of time which is required for transmitting an information and from a time which corresponds to the length of the pulse interval comprising the steps of:

adapting the maximum number of the data transmittable in a pulse interval, which interval corresponds to the length of the pulse interval, wherein said adopting steps includes the step of measuring at least one recently measured pulse interval in consideration of a maximum value of the acceleration.

2. Method as claimed in claims 1 further including transmitting all those data in a pulse interval which are relevant at high speeds.

3. Method as claimed claim 1, further including terminating the data transmission as soon as the next signal pulse of the rotational speed signal appears.

4. Method as claimed in claim 3, wherein the adapting step further includes effecting a protocol of the data being transmitted by omitting individual or several data from the protocol, wherein a minimum duration of at least one preceding pulse interval is determined with respect to any possible number of data being transmitted in order to transmit this number of data, and in that it is determined by way of the established duration of at least one preceding pulse interval how many data may be transmitted as a maximum.

* * * * *

UNITED STATES PATENT AND TRADEMARK OFFICE
CERTIFICATE OF CORRECTION

PATENT NO. : 6,480,138 B1  Page 1 of 1
DATED : November 12, 2002
INVENTOR(S) : Olaf Zinke, Wolfgang Fey and Heinz Loreck It is certified that error appears in the above-identified patent and that said Letters Patent is hereby corrected as shown below:

Column 7,
Line 7, change "Method as claimed in claims 1 further" to -- Method as claimed in claim 1, further --.
Line 10, change "Method as claimed claim 1," to -- Method as claimed in claim 1, --.

Signed and Sealed this

Eighth Day of April, 2003

JAMES E. ROGAN
*Director of the United States Patent and Trademark Office*